(12) United States Patent
Stojanovski

(10) Patent No.: US 6,299,394 B1
(45) Date of Patent: Oct. 9, 2001

(54) MILLING TOOL HOLDER

(76) Inventor: Stojan Stojanovski, 1950 Birchwood, Troy, MI (US) 48084

( * ) Notice: Subject to any disclaimer, the term of this patent is extended or adjusted under 35 U.S.C. 154(b) by 0 days.

(21) Appl. No.: 09/514,893

(22) Filed: Feb. 28, 2000

(51) Int. Cl.[7] .............................. B23Q 5/26; B23B 31/00
(52) U.S. Cl. ........................ 409/234; 279/83; 408/239 R
(58) Field of Search ................................ 409/234, 232, 409/233, 231; 279/83, 97; 408/239 A, 239 R, 238, 226, 713; 82/160

(56) References Cited

U.S. PATENT DOCUMENTS

| | | | |
|---|---|---|---|
| 3,022,084 | * | 2/1962 | Dresback .............................. 279/83 |
| 3,984,192 | * | 10/1976 | Warner et al. ...................... 408/226 |
| 4,647,052 | * | 3/1987 | Bütikofer ............................. 279/83 |
| 4,877,360 | * | 10/1989 | Pfalzgraf ............................. 409/234 |
| 4,913,607 | * | 4/1990 | von Haas ............................ 409/234 |
| 4,978,262 | * | 12/1990 | Tjernstrom ......................... 409/233 |
| 5,110,240 | * | 5/1992 | Zeilinger et al. .................. 409/234 |
| 5,468,102 | * | 11/1995 | Stojanovski ....................... 409/234 |
| 5,660,400 | * | 8/1997 | Käsmeier et al. ................... 279/83 |
| 5,951,217 | * | 9/1999 | Ostermeier et al. ........... 409/234 X |

* cited by examiner

*Primary Examiner*—William Briggs
(74) *Attorney, Agent, or Firm*—Charles W. Chandler

(57) ABSTRACT

A milling tool holder comprising an elongated body adapted to be supported on a milling tool base. The body has a shank-receiving bore. A tool head supports a pair of indexable inserts, and has a shank received in the shank receiving bore to a position in which an annular face on the head faces a similar face on the body. A pair of projections on the face of the body is received in a pair of openings in the tool head to prevent the tool head from rotating with respect to the body.

2 Claims, 2 Drawing Sheets

MILLING TOOL HOLDER

BACKGROUND AND SUMMARY OF THE INVENTION

This invention is related to a two-part milling tool holder, which includes a body, adapted to be mounted on a milling tool base. A replaceable tool head for supporting a pair of indexable inserts has a shank received in an opening in the body. A plurality of projections extend from the body around the shank-receiving opening and are received in recesses in the tool head to prevent the head from rotating with respect to the body.

Milling tool inserts are commonly mounted on the end of an elongated tool holder. It is desirable in some situations to use one type of insert for heavy milling and another insert for cutting a radius or the like.

In my prior U.S. Pat. No. 5,468,102 issued Nov. 21, 1995, to Stojan Stojanovski for "Milling Tool Holder", I disclosed an improved milling tool holder having a replaceable head. The head has a shank received in the body. The shank has a slot that mates with a pin-shaped key in the bore. The key is transverse to the length of the shank. The outer end of the shank has an annular shoulder that seats on a shoulder defining the bore opening. Threaded fasteners mounted on the body have their inner ends engaging the shank to cam the shank into the body. The arrangement is such that the user can readily exchange the head whenever it has become damaged, worn or needs to be exchanged to accommodate a head having a different cutting configuration.

The preferred embodiment of the present invention provides a two-part milling tool holder including a body and a tool head. The tool head has a shank received in an opening in the body to a position adjacent the bottom of the bore. The tool head has a flange that seats around the shank-receiving opening of the body. The body has a pair of integral projections that are received in a pair of recesses in the tool head flange to prevent the tool head from rotating with respect to the body.

In one embodiment, a pair of fasteners cam the shank into pressure contact with the bottom of the bore. In another embodiment, the tool head flange is cammed into pressure engagement with the surface of the body that supports the projections.

Still further objects and advantages of the invention will become readily apparent to those skilled in the art to which the invention pertains upon reference to the following detailed description of the drawings.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
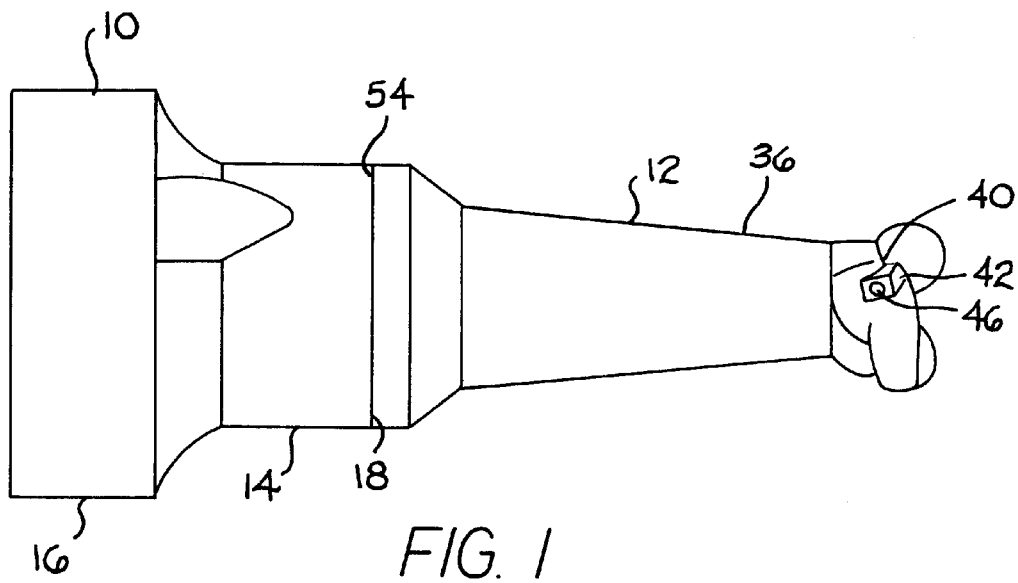
FIG. 1 is a longitudinal view of a two part milling tool holder illustrating the preferred embodiment of the invention.

Referring to the drawings, a preferred tool holder comprises an elongated steel body 10, and an elongated steel tool head 12. The body is adapted to be mounted in the conventional manner on a milling machine base. Body 10 has a generally cylindrical inner end 14 and a flange 16. The body has an outer annular face 18 formed around the opening of an internal bore 20. Bore 20 has a cylindrical inner surface formed about a longitudinal axis 22 which also corresponds with the longitudinal axis of body 10 and head 12.

For illustrative purposes, bore 20 has a depth of about 3", and a diameter of about 2". The overall length of body 10 is 5".

Figure 2:
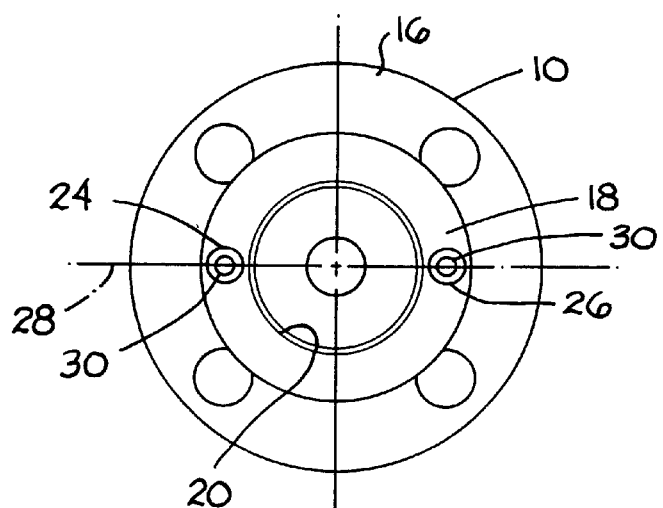
FIG. 2 is an end view of the shank-receiving bore in the body.
Figure 3:
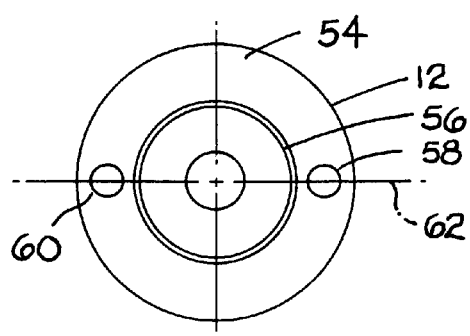
FIG. 3 is an end view of the flange and the shank of the tool head.

Referring to FIGS. 2 and 3, a pair of steel pins function as keys 24 and 26. Each key has about a ⅝" diameter, and projects ¼" above face 18. The two keys are on opposite sides of bore 20 along a diametrical axis 28 that intersects axis 22. Each key is fastened to the body by a socket head screw 30.

Figure 4:
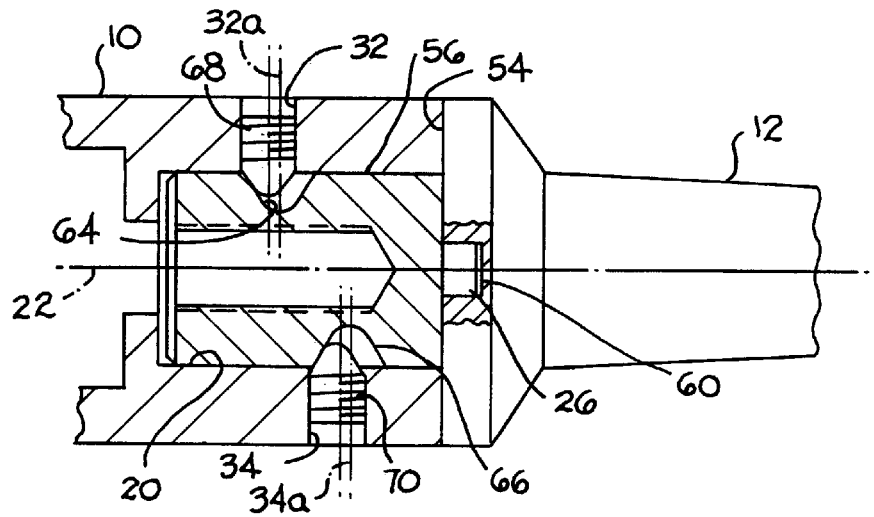
FIG. 4 is a partially sectional view showing the shank received in the body.

FIG. 4 also illustrates the position of key 26 received in recess 60, illustrating the relative position of the axis of the key which is parallel to the axis of the bore and the shank and at right angles to the axis of the threaded cams.

Referring to FIG. 4, the body also has a pair of internally threaded cam openings 32 and 34. The two openings are formed on parallel axis 32a and 34a, respectively, which are at right angles to and intersect longitudinal axis 22, and at right angles to axis 28. Axis 32a is longitudinally spaced about ¾" from axis 34a.

Referring to FIG. 1, tool head 12 has a tapered outer end 36 formed with slot means 38 for mounting indexable cutting inserts 42. Each insert is releasably fastened to the head by a fastener means 46.

Tool head 12 has an annular face 54, and an elongated cylindrical shank 56, received in bore 20. Shank 56 has a length slightly less than the depth of bore 20, and a diameter forming a snug sliding fit in the bore.

Referring to FIGS. 3 and 4, face 54 has a pair of cylindrical openings 58 and 60 which slidably receive keys 24 and 26. Openings 58 and 60 are slightly deeper than the height of the keys, and form a snug sliding fit with the keys. Openings 58 and 60 are disposed on opposite sides of shank 56, along a diametrical axis 62. The shank is inserted into bore 20 until face 18 of the body abuts face 54 of the tool head, as openings 58 and 60 receive keys 24 and 26, preventing any rotation of the tool head with respect to the body.

Referring to FIG. 4, the shank has a pair of counter-drilled openings or recesses 64 and 66 which are slightly offset from threaded openings 32 and 34, respectively, when the shank has been fully received in bore 20. A threaded socket head cam member 68 is threadably received in opening 32, and a second threaded socket head cam member 70 is threadably received in opening 34.

Figure 6:
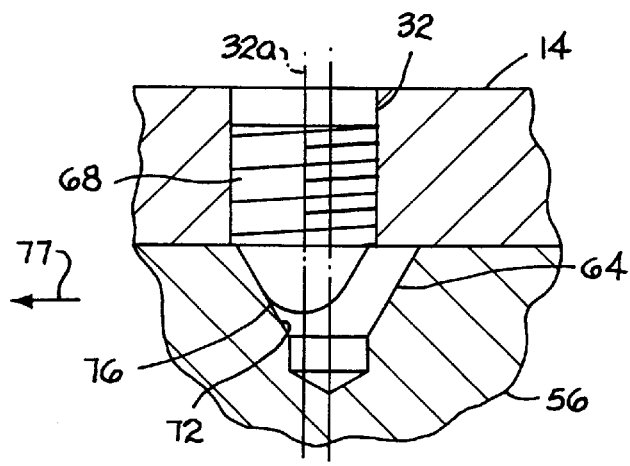
FIG. 6 is an enlarged, fragmentary view showing the manner in which the fasteners cam the shank into the shank receiving opening.

Recesses 64 and 66 are identical except with respect to their locations on opposite sides of the shank. A typical recess 32 and its cam member 68 are illustrated in FIG. 6. Recess 64 has a concave, frusto-conical surface 72 adjacent the inner end of cam opening 32. The axis of recess 64 is offset from axis 32a of cam opening 32. This distance is somewhat exaggerated in FIG. 6 to show that the respective axis of recesses 64 and 66 is closer to face 18 of the body than the axis of the corresponding cam opening.

Cam member 68 has a rounded inner end 76 that slidably engages frusto-conical surface 72. The arrangement is such that as cam member 68 is threadably inserted into cam opening 32, inner end 76 engages surface 72 to cam shank toward the bottom end of the bore, in the direction of arrow 77, thereby causing tool head face 54 to tightly engage tool body face 18.

Similarly, the rounded inner end of cam member 70 slidably engages the frustoconical surface of recess 66 to cam tool head face 54 toward tool body face 18.

Face 54 tightly abuts face 18 in order to locate the inserts in a proper cutting position when the head is replaced with a different pair of inserts.

To assemble the tool holder, the inserts are mounted in the usual manner on the outer end of the head. The shank is inserted in bore 20 until keys 24 and 26 are received in openings 58 and 60.

Cam members 68 and 70 are then screwed into their respective recesses to cam the shank until face 54 abuts face 18.

The process is reversed, to remove the tool head.

Figure 5:
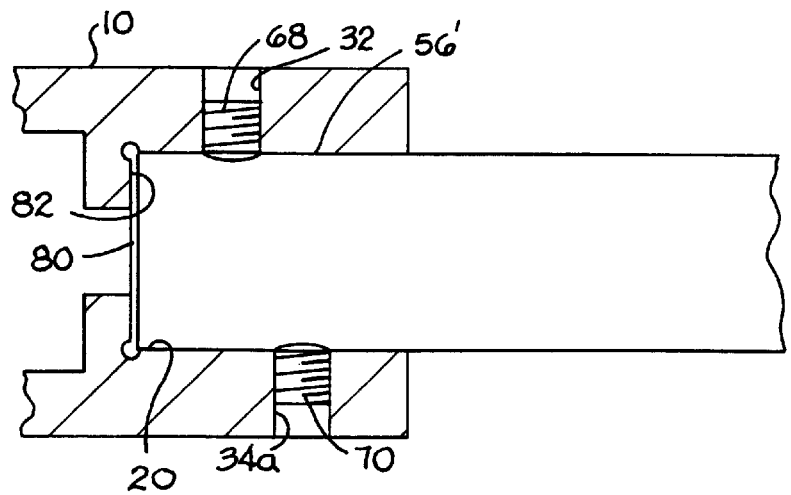
FIG. 5 shows another embodiment of the invention.

FIG. 5 illustrates a modified version of the embodiment of FIG. 4. In FIG. 4, the shank 56 is slightly shorter than the depth of bore 20 so that the fasteners cam the shank until face 54 abuts face 18. In the embodiment of FIG. 5, shank 56' does not have flange 16 so that the cam members cam the shank until bottom face 80 abuts bottom face 82 of the bore.

Having described my invention, I claim:

1. A tool holder assembly, comprising:

an elongated tool holder body having a longitudinal axis, an end face, an elongated shank-receiving bore extending from said end face into said body along said longitudinal axis, said bore having a planar bottom wall;

a tool holder head adapted to support at least one cutting insert, said tool holder head comprising a cylindrical shank slidably receivable in said shank-receiving bore, and said shank having a planar shank end face engageable in a face-to-face relationship with the bottom wall of said bore;

means for biasing said tool holder head along said longitudinal axis to pressure engage the shank end face with the bottom wall of the shank-receiving bore;

said biasing means comprising a plurality of threaded openings in said tool holder body extending normal to said longitudinal axis in a common plane containing said longitudinal axis; said threaded openings being spaced equi-angularly apart in the circumferential direction, said threaded openings being in communication with said bore at axially spaced points thereal-ong;

said shank having frusto-conical recesses adapted to register with said threaded openings when the shank is inserted into the bore; and a threaded fastener threaded into each of said threaded openings to penetrate a respective frusto-conical recess, whereby said tool holder head is biased along said longitudinal axis toward said bottom wall.

2. The tool holder assembly of claim 1, wherein each of said threaded fasteners has a rounded spherical tip engageable with the surface of a respective frusto-conical recess.

* * * * *